(12) United States Patent
Smith

(10) Patent No.: US 6,661,587 B2
(45) Date of Patent: Dec. 9, 2003

(54) CONFOCAL OPTICAL DESIGN FOR OPTICAL COUPLING

(76) Inventor: Richard G. Smith, 3111 Aspen La., Center Valley, PA (US) 18034

( * ) Notice: Subject to any disclaimer, the term of this patent is extended or adjusted under 35 U.S.C. 154(b) by 60 days.

(21) Appl. No.: 10/085,483

(22) Filed: Feb. 26, 2002

(65) Prior Publication Data

US 2003/0161052 A1 Aug. 28, 2003

(51) Int. Cl.$^7$ .............................. G02B 9/12; G02B 6/32; G02B 3/00
(52) U.S. Cl. ..................... 359/784; 385/33; 385/35; 359/664
(58) Field of Search ................... 359/664, 784; 385/27, 33, 35, 39

(56) References Cited

U.S. PATENT DOCUMENTS

| | | | |
|---|---|---|---|
| 4,265,511 A | * 5/1981 | Nicia et al. | 385/74 |
| 4,966,444 A | 10/1990 | Droegemueller et al. | 359/641 |
| 4,981,335 A | 1/1991 | Gaebe | 385/33 |
| 5,066,089 A | * 11/1991 | Greil et al. | 385/35 |
| 5,066,092 A | 11/1991 | Droegemueller et al. | 385/33 |
| 5,074,682 A | 12/1991 | Uno et al. | 385/93 |
| 5,745,625 A | 4/1998 | Aikiyo et al. | 385/94 |
| 5,926,593 A | 7/1999 | Asami et al. | 385/34 |
| 5,986,819 A | 11/1999 | Steinblatt | 359/663 |
| 6,014,484 A | 1/2000 | Duck et al. | 385/34 |
| 6,442,310 B1 | * 8/2002 | Wills | 385/33 |
| 2002/0018618 A1 | 2/2002 | Xie et al. | 385/33 |

OTHER PUBLICATIONS

H. Kogelnik and T. Li; "Laser Beams and Resonators"; Proc. IEEE, vol. 54, pp. 1312–1329, Oct. 1966.

Eugene Hecht and Alfred Zajac; "Optics"; pp. 171–174, (1974).

* cited by examiner

Primary Examiner—David N. Spector
(74) Attorney, Agent, or Firm—Volentine Francos, PLLC

(57) ABSTRACT

In accordance with an exemplary embodiment of the present invention, an optical apparatus includes a first optical element, a second optical element, and a third optical element disposed between the first and second optical elements. Light from the first optical element is incident upon the second optical element at an angle with respect to the optic axis that is substantially independent of an offset of the first optical element in a direction orthogonal to the optic axis.

23 Claims, 8 Drawing Sheets

| PARAMETER | GENERAL LENS ($t, R_1, R_2$) | BALL LENS ($R$) |
|---|---|---|
| A | $1 - \dfrac{(n-1)}{n} \dfrac{t}{R_1}$ | $\dfrac{(2-n)}{n}$ |
| B | $\dfrac{t}{n}$ | $\dfrac{2R}{n}$ |
| C | $\dfrac{t(n-1)^2}{nR_1R_2} - (n-1)\left(\dfrac{1}{R_1} + \dfrac{1}{R_2}\right)$ | $-\left(\dfrac{n-1}{n}\right)\left(\dfrac{2}{R}\right)$ |
| D | $1 - \left(\dfrac{n-1}{n}\right)\left(\dfrac{t}{R_2}\right)$ | $\dfrac{(2-n)}{n}$ |
| Z (−) | $-\dfrac{D}{C}$ | $\dfrac{(2-n)R}{2(n-1)}$ |
| Z (+) | $-\dfrac{A}{C}$ | $\dfrac{(2-n)R}{2(n-1)}$ |

Fig. 7

CONFOCAL OPTICAL DESIGN FOR OPTICAL COUPLING

FIELD OF THE INVENTION

The present invention relates generally to optical transmission and reception devices and packages, and particularly to an optical assembly which significantly relaxes tolerances of one device relative to another while maintaining high coupling therebetween.

BACKGROUND OF THE INVENTION

Optical communications have gained widespread acceptance for both telecommunications (telecom) and data communications (datacom) applications. Moreover, the telecom and datacom applications are often digital optical communications systems. Telecommunication systems may operate over single-mode fiber at distances from approximately 10 km to approximately 100 km and greater, and employ lasers which emit light at wavelengths of approximately 1310 nm to approximately 1600 nm. Data communications systems may cover shorter distances of up to a few kilometers, and may use multi-mode fiber. Data communications systems can employ laser devices as well, typically having emission wavelength of approximately 600 nm to approximately 850 nm.

As the transmission and reception rates in the telecom and datacom industries continue to increase, there are ever increasing demands placed on the various components of the optical communication system. In addition, many of these demands are further complicated by the need to manufacture these components on large scale, while maintaining required accuracies and performance. One such demand placed on optical components is the efficient coupling of power between optical waveguides and optical devices; such as between a laser or amplifier, and an optical fiber. Known techniques to improve the coupling between a laser and an optical fiber include the use of a micro-lens on the end of the fiber to match the modes of the laser and the optical fiber, and the use of bulk optics or a combination of micro-lenses and bulk optics.

While the use of various types of lens elements have generally improved the ability to couple an active device such as a laser to an optical wavguide, there are certain drawbacks to conventional approaches including compromised performance and difficulty of manufacture. To wit, in most optical system designs, the laser is ideally located on an optic axis of the optical waveguide and the coupling elements therebetween. In practice, however, the active area of the active device may not be located on this optic axis. In the example of a laser, when the active area of the laser is not located on the optic axis in conventional optical systems, the achievable coupling is reduced, often to unacceptable levels.

The source of the offset may arise from the combination of a number of tolerances. Such tolerances may include the thickness of the semiconductor laser chip, the thickness of any bonds or contacts used therewith, and the tolerances in the thickness of other piece parts. For purposes of illustration, these tolerances can result in a height offset of active area the laser with respect to the optic axis of the system being on the order of approximately ±15 $\mu$m or more. In conventional optical systems, such an offset will result in unacceptable loss of achievable coupling.

As described, in conventional optical systems an offset of the active device will result in the focusing of the beam on the image plane (x-y plane) of the optical fiber at a position removed from the optic axis. Moreover, the beam may be at an angle with respect to the optic axis. This angular deviation in the image plane of the optical fiber is proportional to the laser offset from the optic axis.

One conventional method used to improve the coupling to the optical fiber requires active alignment of the fiber. This technique may employ x-y-z positioning and angular alignment of the fiber. While this method may be beneficial, it nonetheless complicates the alignment process, and requires a more complicated design. Accordingly, this conventional angular alignment technique is not practical to implement in larger scale manufacturing as it is complex and costly.

Another conventional technique which has been employed to reduce the offset tolerances of an active device is to bond the active layer of the device to a reference plane (e.g. a substrate). This is often referred to as bonding the active region of the active device "down." However, for various reasons, it is advantageous to bond the active device with the active region "up", and thereby not bonded to the reference plane.

Accordingly, what is needed is a technique for improving the coupling between optical devices which overcomes at least the drawbacks of conventional approaches described above.

SUMMARY OF THE INVENTION

In accordance with an exemplary embodiment of the present invention, an optical apparatus includes a first optical element, a second optical element, and a third optical element disposed between the first and second optical elements. Light from the first optical element is incident upon the second optical element at an angle with respect to the optic axis that is substantially independent of an offset of the first optical element in a direction orthogonal to the optic axis.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

FIG. 4($b$) is an optical coupling system in accordance with another exemplary embodiment of the present invention.

FIG. 6(b) is a graphical representation of the coupling loss as a function of laser offset in accordance with an exemplary embodiment of the present invention.

FIG. 6(c) is a graphical representation of the coupling loss as a function of laser offset in accordance with an exemplary embodiment of the present invention.

FIG. 7 is a tabular representation of ABCD matrix elements for use in accordance with an exemplary embodiment of the present invention.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Briefly, the present invention relates to an optical apparatus which fosters improved coupling between a first optical element and a second optical element. To this end, the present invention includes an optical apparatus that achieves a desired level of magnification/demagnification. The optical apparatus enables a substantially optimal coupling between a first optical element and a second optical element to be realized substantially independently of a position of the first optical element relative to an optical axis. In a region between the optical elements, the optical beam may be substantially collimated.

According to an exemplary embodiment of the present invention, the first optical element is an active optical device, and may be offset in a direction orthogonal to an optic axis without substantially affecting the angle of incidence of a beam upon a second optical element. Advantageously, large scale manufacturing may be realized without significant active alignment of the optical elements which comprise the optical apparatus, while maintaining acceptable coupling between the first and second optical devices.

Figure 1:
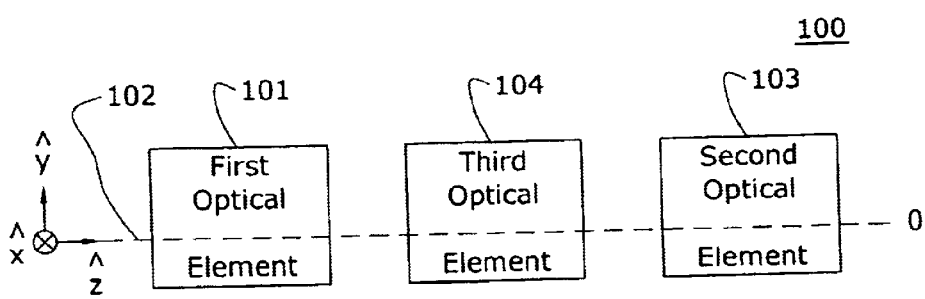
FIG. 1 is a functional block diagram of an optical system in accordance with an exemplary embodiment of the present invention.

Turning to FIG. 1, an optical apparatus 100 in accordance with an exemplary embodiment of the present invention is shown. A first optical element 101 is disposed proximate to an optic axis 102 of the optical apparatus 100. A second optical element 103 is also disposed proximate to the optic axis 102, and is adapted to accept light from the first optical element 101. A third optical element 104 is also disposed proximate to the optic axis 102, and usefully couples light from the first optical element 101 to the second optical element 103.

In accordance with the exemplary embodiment shown in FIG. 1, the third optical element 104 couples light to the second optical element 103 such that an angle of incidence of light upon the second optical element 103 is substantially independent of any offset of the active area of first optical element 101 in a direction which is perpendicular to the optic axis 102. Advantageously, this relieves alignment tolerances during manufacture. For example, in accordance with an illustrative embodiment, the height-tolerance (also referred to as stacking tolerance) in the y-direction has substantially no impact upon the angle of incidence of light upon the second optical element 103.

In the exemplary embodiment shown in FIG. 1, the third optical element 104 is a confocal optical system, the details of which are described more completely herein. Illustratively, the optical elements of the confocal optical system are lenses. As will become more clear as the present description proceeds, the lens elements of the confocal optical system are illustratively spherical (ball), aspherical and plano-convex lenses; and may be combination thereof. Moreover, other optical elements may be used instead of or in combination with the referenced lens elements to carry out the confocal optical system in accordance with the present invention. For example, it is noted that lens elements which are convex or both the entrance and exit faces, and well as lens elements which are concave on one face of the lens and convex on the other may be used to realize the confocal optical system in accordance with the present invention. In addition, optical elements including diffractive optical elements such as holograms, binary or digital optical elements, as well other as reflective and refractive optical elements. It is noted that combinations of elements chosen from the group described immediately above may be used in this capacity as well. Finally, it is noted that the above referenced elements are intended to be illustrative of and are not intended to limit the scope of the present invention as set forth in the appended claims. In fact optical elements other than those explicitly mentioned that are within the purview of one of ordinary skill in the art having had the benefit of the present disclosure could be used.

In accordance with the exemplary embodiment shown in FIG. 1, the first optical element 101 is an active optical device. Illustratively, the first optical element 101 may be a laser or other light emitting device. The second optical element 103 is illustratively an optical waveguide such as an optical fiber. It is noted that these are merely illustrative of the present invention, and the first optical element 101 could in fact be a photodetector to include an avalanche photodetector (APD) or a p-i-n (PIN) photodetector. Of course, from the principle of reciprocity in optics, in this example light traveling from the second optical element 103 could be coupled to the detector in an efficient manner substantially independently of the offset of the detector in a direction perpendicular to the optic axis 102. It is noted that the second optical element 103 could be another type of optical waveguide such as a planar optical waveguide may be used. It is further noted that the above recited elements are intended to be illustrative of first and second optical elements 101 and 103, respectively, and in no way limiting of the invention. In fact, other elements within the purview of one or ordinary skill in the art may be added to or substituted for those explicitly mentioned above.

As is described more fully herein, one further consideration in the design of an optical system for coupling a first optical element 101 to a second optical element 103 using a third optical element 104 therebetween is the collimation of the optical beam along a particular region of the optical apparatus 100. This collimated region in the optical path is desirable for a variety of reasons. For example, it may be useful to locate an optical isolator or other optical element in this region. Illustratively, if the third optical element 104 were comprised of two lens elements such as those above, it may be desirable to have light collimated in the region between the two lens elements.

As referenced previously, any offset of the first optical element relative to the optic axis results in a variation in the angle of incidence of the optical beam upon the second optical element. For example, turning to FIG. 2, when a laser (not shown) is located with its active region along the optic axis, for example at position 204, light from the laser which is incident upon the first spherical lens 201 emerges in the collimated region 203 as first collimated beam 205. This collimated beam 205 is incident upon the second spherical lens 202, and is focused on an optical fiber 206 with a substantially normal angle of incidence. However, for example, if the active region of the laser undergoes a translation or offset in the +y-direction, to a position 207, this differential (δy) can have a significant impact upon the angle of incidence of the light upon the optical fiber 206.

Figure 2:
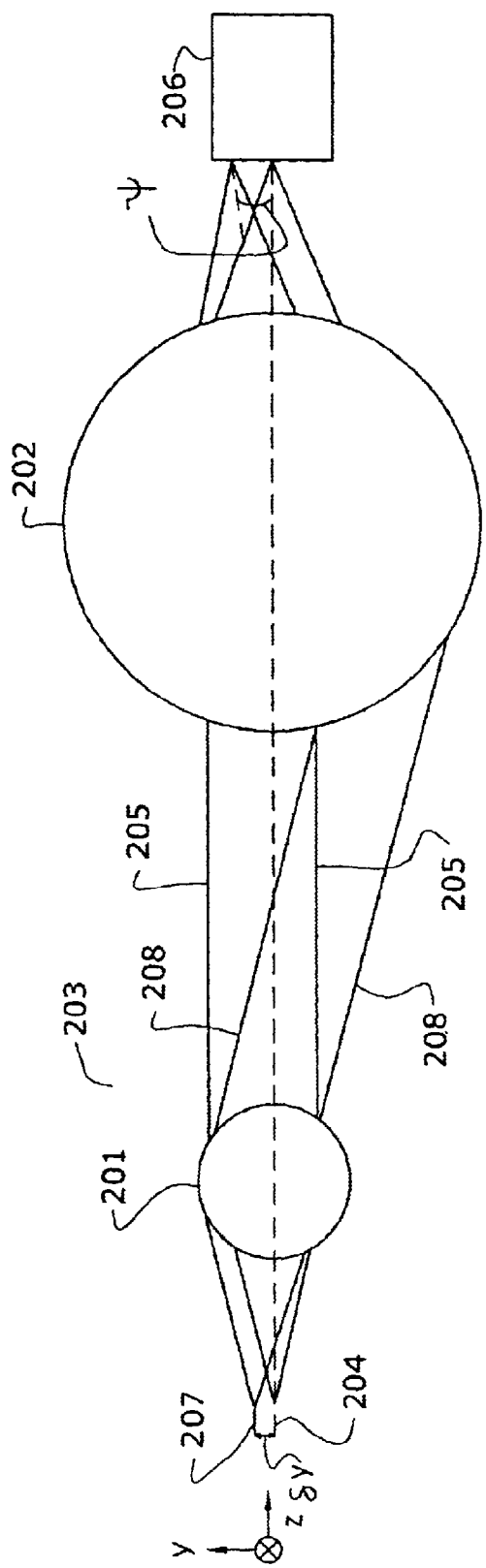
FIG. 2 is an optical system showing effect of offset of a laser in the y-direction ($\delta y$) on the angle ($\Psi$) with respect to the optimum angle of incidence according to a conventional optical structure.

As shown in FIG. 2, if the active region of the laser is at a position 207, light which is incident upon the first spherical optical element 201 emerges in the collimated region 203 as second collimated beam 208. This second collimated beam 208 makes an angle with respect to the optical axis and is incident upon the second spherical lens 202 at a position off the optic axis. After emerging from the ball lens 202, the light is focused along an image plane (not shown) in which the optical fiber 206 is disposed. However, while light from the laser disposed at second position 207 is disposed on the image plane of the optical fiber, the incident beam makes an angle Ψ with respect to the optimum angle of incidence, mainly the normal to the image plane. As will become more clear as the description proceeds, the coupling to an optical fiber is reduced in proportion to the square of the angle of incidence (i.e., Ψ²) relative to the optimum angle of incidence (i.e. parallel to the optic axis of the waveguide). Of course, an adverse impact on the coupling has an adverse impact in the ultimate performance of the optical system. Accordingly, it is useful to optimize the coupling of the optical mode from the laser device to the optical mode of the fiber.

As is known, the optical modes of a laser and of a fiber can generally be approximated by Gaussian beam profiles. One parameter that is useful in analysis of mode coupling between Gaussian beams is known as the spot size. Generally, the spot size is the radius at which the electric field falls to $$\left(\frac{1}{e}\right)$$

of its value on an optic axis. Alternatively, the spot size can be referred to as the radius at which the optical power of the beam falls off as $$\left(\frac{1}{e^2}\right)$$

times its on-axis value.

Another parameter useful to understanding the coupling of modes is the far field diffraction angle ($\Theta_{ff}$), which is inversely proportional to the spot size. In the exemplary embodiments described herein, it is assumed that the spot size of the incident mode is substantially the same as that of the optical fiber to which the laser mode is coupled. Moreover, the endface of the fiber is illustratively "flat," being substantially perpendicular to the optic axis of the optical fiber. As can be readily appreciated, maximum coupling occurs when the incident beam travels parallel to the optic axis, and is thereby incident parallel to a normal to the endface of the fiber. Of course, if the fiber has a beveled endface, maximum coupling would occur when the mode makes an angle with respect to the fiber axis (optic axis of the fiber) such that, after refraction, the mode travels along the fiber axis.

If the incident mode makes an angle Ψ with respect to the optimum angle of incidence, then the coupling decreases according to the relation:

$$\text{Coupling Loss(dB)} \cong -4.34\left(\frac{\Psi}{\Theta_{ff}}\right)^2 \quad (1)$$

where $\Theta_{ff}$ is the far field angle, and is given by:

$$\Theta_{ff} = \frac{\lambda}{\pi\omega_0} \quad (2)$$

where λ is the wavelength of the mode, and $\omega_0$ is the spot size of the fiber mode.

A typical value for the spot size $\omega_0$ of an optical fiber is on the order of approximately 5 μm, and the far field angle of a typical optical fiber at a wavelength of 1.55 μm is on the order of 0.1 radians.

From eqn. (1), the coupling loss increases in proportion to the square of the offset angle Ψ. As such, significant reductions in coupling occur with relatively small increases in the angular offset. For purposes of illustration, a 1 dB coupling loss occurs when the offset angle Ψ is approximately 0.048 radians, or approximately 2.78° from the optimal coupling angle. As can be readily appreciated, therefore, it is useful to minimize coupling losses by imaging the optical mode from the laser onto the optical fiber at a suitable angle.

As will become more clear as the present description proceeds, according to an exemplary embodiment of the present invention, the dependence of the angle of incidence of the beam on the offset position of the active area of the device (distance from the optical axis in a direction perpendicular thereto) is substantially eliminated. Ultimately, this fosters improved coupling between the active device and the waveguide, while simultaneously improving the ease of manufacture of the optical system.

As noted previously, when the emission from a laser or other active device is located on the optic axis of the optical system, the centroid of the beam will follow the optic axis. However, tolerance issues to include stacking tolerances can result in an offset of the active device, and require a more rigorous analysis of the relation of device offset to incident angle on the optical fiber.

According to the confocal optical system of the exemplary embodiments of the present invention described herein, accurate positioning of the emitter (laser) can be eliminated, and the need to "tilt" to the fiber is also substantially avoided. A quantitative analysis of an exemplary confocal optical system is described presently.

A valid approximation to the analysis of the transformation of the optical beam (mode) from the laser as it passes through an optical system may be obtained by considering the paraxial approximation. Such an approximation assumes small angle deviation of the beam relative to the optic axis. Making this assumption, results in:

$$\tan(\Theta) \cong \sin(\Theta) \cong \Theta \quad (3)$$

Using the paraxial approximation, the position and slope of the beam, after passing through an interface may be described by a transformation matrix which is often referred to as the ABCD matrix. This transformation may be expressed as:

$$\begin{pmatrix} y \\ y' \end{pmatrix}_{out} = \begin{pmatrix} A & B \\ C & D \end{pmatrix} \begin{pmatrix} y \\ y' \end{pmatrix}_{in} \tag{4}$$

where y is the position of the center of the mode; y' is the slope of the center of the mode; "out" refers to these parameters at the emergence from the optical system; and "in" refers to these parameters at the input to the optical system. The values of parameters A, B, C, and D are readily determined using Snell's Law as well as simple geometric optics. Moreover, examples of the ABCD parameters for a single lens are found in the table shown in FIG. 8.

For a sequence of optical interfaces, and propagation between the interfaces, the matrix for the combined structure is determined using matrix multiplication. Illustratively, in the case of a single lens, the matrix for the lens consists of the product of three matrices: the matrix for the beam entering a lens; the matrix for the beam propagating through the lens; and the matrix for the beam exiting the lens. For a two-lens system, such as that used in accordance with an exemplary embodiment of the present invention, the overall transformation (ABCD) matrix is the product of the matrices of each of the two lenses and three regions of propagation in air. Further details of the transformation matrices and their use may be found in standard optic textbooks, such as *Optics,* by Eugene Hecht and Alfred Zajac, Addison-Wesley Series in Physics, 1979, pp. 171–175, the disclosure of which is specifically incorporated by reference herein.

Applying the matrix transformation technique described above to an exemplary embodiment for coupling a laser to an optical fiber requires a matrix for the propagation of the laser mode to the first lens; a matrix for the through the first lens; a matrix for the propagation between the two lenses; and a matrix for the propagation of the mode through the second lens.

As referenced above, it is useful to determine the relationship between the input position of the mode ($y_{in}$) to its output slope upon emerging from the system. Ultimately, this will aid in the analysis of the relationship of the device offset to the angle of incidence ($\Psi$) relative to the input offset of the device, which impacts the coupling of the mode to the waveguide as described above. Quantitatively, the output slope of the mode is:

$$y'_{out} = C y_{in} + D y'_{in} \tag{4a}$$

In general, it is possible to align the axis of the laser/emitter such that the input slope, $y'_{in}$, is negligible. Hence only the dependence of the output angle, $y'_{out}$, to the input position need be considered.

The dependence on the input slope, $y'_{in}$, is considered negligible for the following reason. In the present exemplary embodiment, the matrix element A defines the magnification of the optical system. For an illustrative laser, the spot size, $\omega_{las}$, is approximately 1 µm, while the fiber spot size, $\omega_{fiber}$ is approximately 5 µm. Thus, the magnification from laser to fiber is about 5x. The matrix element D relates the output angle to the input angle and is the reciprocal of A. Thereby, given the above exemplary parameters, the slope of the ray is approximately 0.2 times the input slope. By controlling the input angle (i.e., $y'_{in}$) to on the order of approximately 5°, the output angle will be approximately 1°, and the coupling loss attributable thereto is approximately zero.

From eqn. 4(a), it can be seen that the coefficient C relates the output angle after the second lens to the input position, namely the y-position of the laser relative to the optic axis. Accordingly, from the ABCD matrix for the optical system, the value for C for the overall system ($C_{system}$) is given by:

$$C_{system} = C_1 C_2 (D_3 - f_1^+ - f_2^-) \tag{5}$$

where $C_1$ and $C_2$ are the C parameters for the first and second lenses, respectively; $D_3$ is the spacing between the output face of the first lens and the input face of the second lens; $f_1^+$ is the distance to the right of the entrance face of the left-most lens where a collimated (parallel or plane wave from the right) beam will focus (referred to herein as the right hand focal length of the first lens); and $f_2^-$ is the distance to the left of the exit face of the right-most lens where a collimated (parallel or plane wave from the left) beam will focus (referred to herein as the left hand focal length of the second lens).

As can be appreciated, when the spacing between the two lenses ($D_3$) is equal to the sum of the respective focal lengths, $C_{system}$ becomes nullity. When this condition is met, the output angle of the beam is independent of the position of the laser. As such, the equality of the sum of the focal lengths ($f_1^+$ and $f_2^-$) and the spacing ($D_3$) defines a confocal optical system. Further details of the confocal optical systems may be found in *Laser Beams and Resonators,* by H. Kogelnik and T. Li, Proceedings of IEEE, Vol. 54, pp. 1312–1329, October 1966. The disclosure of the referenced article is specifically incorporated by reference herein.

Figure 3:
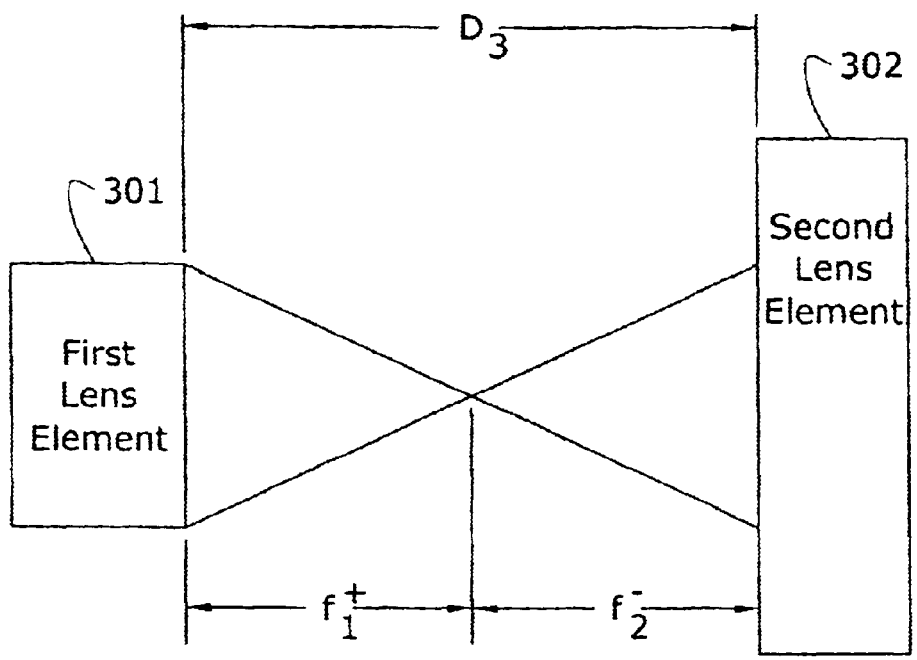
FIG. 3 is a perspective view showing the confocal condition for two lenses in accordance with an exemplary embodiment of the present invention.

A confocal optical system in accordance with an exemplary embodiment of the present invention is shown in FIG. 3. The confocal optical system 300 in accordance with the presently described exemplary embodiment of the invention may be the third optical element 104 of the illustrative embodiment of FIG. 1. The confocal optical system 300 includes a first lens element 301 and a second lens element 302. The first and second lens elements 301 and 302, respectively, may be any lens elements suitable to achieve a confocal optical system. To wit, any lens combination in which the lenses are separated by a distance, $D_3$, as shown, and in which the sum of the right hand focal length ($f_1^+$) of the first lens and the left hand focal length ($f_2^-$) of the second lens are equal to the spacing between the output faces of the first and second lenses may be used. For example, these lenses may be those described above in connection with third optical element 104 of the exemplary embodiment of FIG. 1.

As referenced previously, it is useful to have the length of the collimated region (i.e., $D_3$) at a certain minimum length. While the confocal condition described immediately above may be achieved using ball lenses, as will become more clear as the present description proceeds, the use of ball lenses may not allow a sufficiently large collimated region. Moreover, in optical communication systems employing lasers, it is necessary to reduce the reflections that reach the laser to very low levels (e.g., less than 50 dB). Accordingly, an optical isolator may be used to reduce the level of optical reflections. Such an isolator performs optimally in a collimated beam and hence is normally positioned in the region between the two lenses when the beam is collimated. In typical applications the spacing (i.e., $D_3$) reserved for the isolator is several millimeters, with an illustrative spacing being 3.0 mm.

Turning to FIG. 4(a), another coupling system in accordance with an exemplary embodiment of the present invention is shown. In the exemplary embodiment shown in FIG. 4(a), a two-lens confocal optical system includes a spherical lens 403 and a planoconvex lens 404. The optical system 400 includes a first optical device 401 and a second optical device 402. Again, the first optical device may be an emitter such as a laser, and the second optical device may be a waveguide such as an optical fiber.

FIG. 4(b) shows another optical system 400 in accordance with an exemplary embodiment of the present invention. The system 400 of FIG. 4(b) is virtually identical to the system 400 of FIG. 4(a) except that the spherical lens 403 has been replaced with an aspherical lens 405. The aspherical lens 403 is similar to the planeoconvex lens 404, except that its curved surface is not spherical.

It can be shown from the ABCD matrix calculation techniques described above, that the aspherical lens 403 and the planoconvex lens 404 enables the requisite confocal condition to be realized with a spacing $D_3$ which is suitably large for practical implementations of the optical system 400. As will become more clear as the present description proceeds, the exemplary embodiments of FIGS. 4(a) and 4(b) are particularly beneficial as the coupling loss between the first element 401 and the second element 402 is not significantly impacted by offset of the first element 401.

Whether using the illustrative coupling system of FIG. 3, FIG. 4(a), or FIG. 4(b), it can be readily appreciated that the confocal design in accordance with an exemplary embodiment of the present invention enables the input position of the active area of the active device to vary in directions perpendicular to the optic axis, while having substantially no effect on the output angle from the second lens element, and therefore on the incident angle of the beam on the optical waveguide. Accordingly, variation of the offset of the active device due to stacking tolerance, or other tolerances, will have no substantial impact on the angle $\Psi$ in eqn. (1). Therefore, it follows that the offset of the active device of either optical system 300 or 400 will have no significant impact on the coupling efficiency of the laser to the optical waveguide.

The above description of the confocal optical system in accordance with exemplary embodiments of the present invention provides improved performance enabling stacking tolerance issues to be mitigated relative to coupling between the active device and the optical fiber. In practice, it may be difficult to achieve a perfectly confocal system. As such, it is useful to determine the acceptable tolerance of the confocal system to maintain suitable coupling.

From eqn. 4(a) above, the relation between the output angle and the input position is given by:

$$\Psi = C_{system} y_{in} \quad (6)$$

It is desirable to keep the output angle, $\Psi$, below a maximum value. Illustratively, from equation (1), with $\Theta_{ff}$ approximately 0.1 rad, and coupling loss of 0.25 dB (i.e., an approximately 5% power less) $\Psi$ is approximately 0.024 rad (1.4°). Moreover, it is useful to achieve this maximum output value for a prescribed maximum input offset of the active device. Quantitatively, the $C_{system}$ value of eqn. (6) must satisfy the following condition:

$$C_{system} < \frac{\Psi_{max}}{y_{max}} \quad (7)$$

For purposes of illustration, the uncertainty in the location of the radiation source is as much as 25 $\mu$m, and hence $y_{max}$ is approximately 25 $\mu$m. Nonetheless, coupling loss is usefully maintained in the range of approximately less than 0.25 dB to approximately 1.0 dB. Given these parameters, the value of $C_{system}$ in eqn. (7) must be less than approximately 0.002/$\mu$m. Usefully, the value of $C_{system}$ in eqn. (7) is less than approximately 0.001/$\mu$m.

Figure 4:
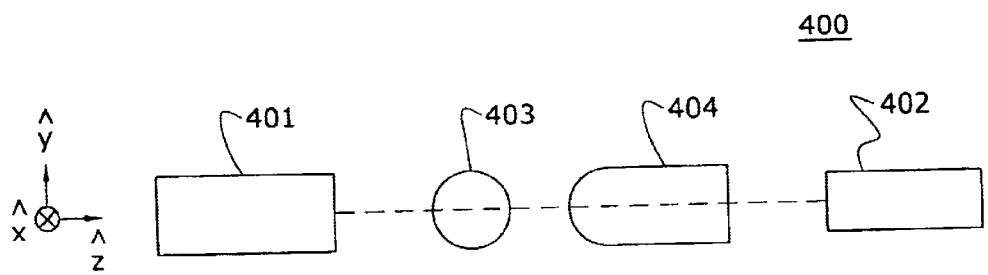
FIG. 4($a$) is an optical coupling system in accordance with another exemplary embodiment of the present invention.
Figure 4:
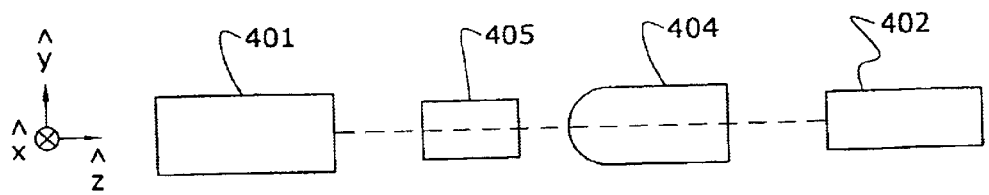
Figure 5:
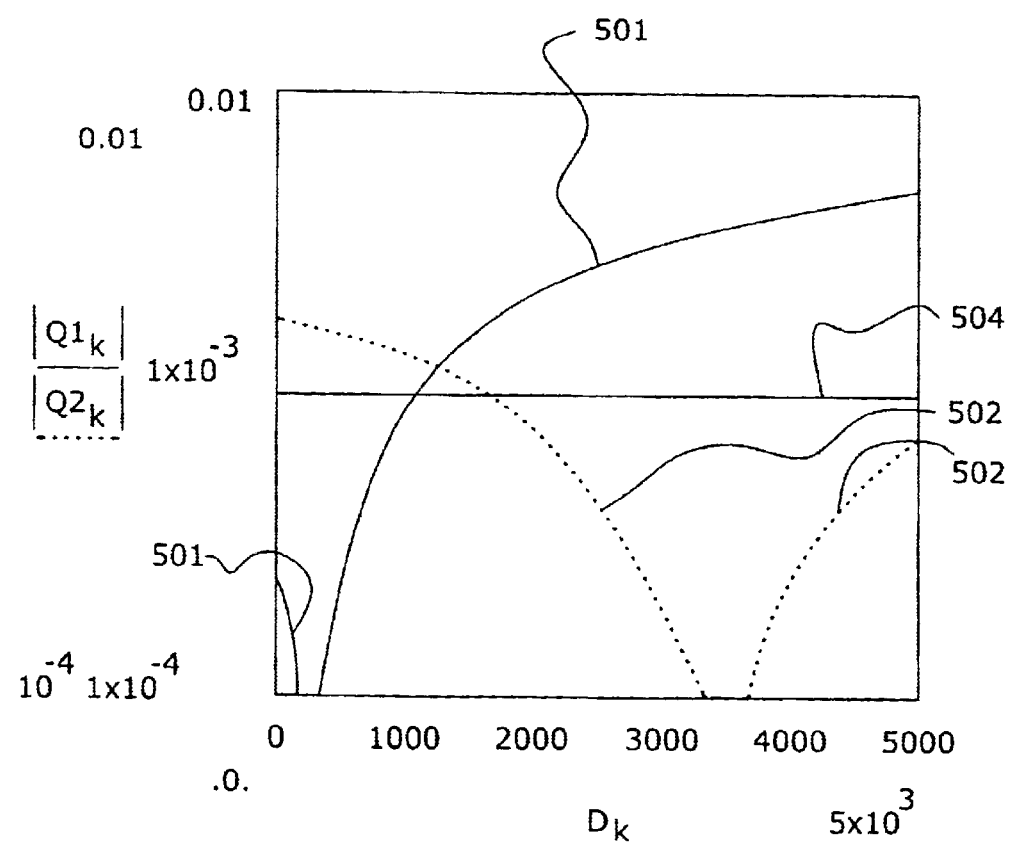
FIG. 5 is a graphical representation of the C parameter ($C_{system}$) for two optical systems as a function of spacing between two lenses therein, in accordance with exemplary embodiments of the present invention.

For purposes of illustration, the $C_{system}$ for the lens systems of the exemplary embodiments shown in FIGS. 3 and 4 are represented graphically in FIG. 5. To wit, FIG. 5 is a graph of the $C_{system}$ versus spacing ($D_3$) between the two lenses. Graph 501 is the graph of $C_{system}$ versus spacing of two ball lenses, such as shown in the exemplary embodiment of FIG. 3. Graph 502 is a graph of the $C_{system}$ versus spacing between a planoconvex lens and a ball lens such as shown in the exemplary embodiment of FIG. 4(a).

The system for which $C_{system}$ is shown in graph 501 illustratively includes two ball lenses having radii of 500 $\mu$m and 1,500 $\mu$m, respectively. The index of refraction of each of these ball lenses is 1.817. The system for which the $C_{system}$ is shown in graph 502 includes a ball lens having a radius of 500 $\mu$m and index of refraction of 1.817; and a planoconvex lens having index of refraction of 1.455, a front radius of 1,500 $\mu$m, a flat-back surface, and a thickness of 2,000 $\mu$m. As can be appreciated, the $C_{system}$ of graph 501 is less than $1 \times 10^{-3}/\mu$m (shown at 504) only for a relatively small spacing of the lenses. In contrast, graph 502 for the ball lens/planoconvex lens system results in $C_{system}$ values of less than $1 \times 10^{-3}/\mu$m for a spacing in the range of approximately 1,700 $\mu$m to approximately 5,000 $\mu$m.

In practical systems, the spacing between the first and second lenses is usefully on the order of approximately 3,000 $\mu$m to allow space for an isolator, a package window, and other elements. As shown in graph 501, at a spacing of 3 mm, the C value ($C_{system}$) for the two-ball lens system is on the order of $3 \times 10^{-3}$, which is a factor of three greater than is desired to ensure acceptable coupling. As such, the $C_{system}$ for the illustrative two-ball lens system requires that the laser offset from the optic axis be maintained at approximately 8.33 $\mu$m, or less. Beyond this offset, the coupling loss value is unacceptable.

By comparison, as shown in graph 502, a confocal optical system comprised of a ball lens and a planoconvex lens system having a spacing between lenses of 3,000 $\mu$m the $C_{system}$ value is less than $3 \times 10^{-4}/\mu$m, which is a factor of three less than the desired $C_{system}$ value of 0.001/$\mu$m from eqn. (7) and the associated discussion. As such, the angle of the output beam from the planoconvex lens is sufficiently small that it does not affect the coupling between the active device and the optical waveguide (fiber).

It is noted that the above described lens systems are merely illustrative of the present invention. To this end, the $C_{system}$ of the exemplary lens system is inversely proportional to the respective radii, R, of the lenses. Hence, it is possible to create a confocal lens system in keeping with the present invention using ball lenses which are comparatively larger than described. Of course, for reasons described above, it may be beneficial to incorporate a plano-convex lens or its equivalent in the confocal design of the present invention.

Turning to FIG. 6(a), the optical coupling as a function of active device offset from the optic axis is shown for the two lens systems shown in the exemplary embodiments of FIGS. 3 and 4(a). To this end, the curve 601 represents optical coupling as a function of device offset for a two spherical lens system, while curve 602 is for a spherical lens/planoconvex lens system, also described above. It is noted that the left-side ordinate of the graph of FIG. 6(a) is for curve 601, and the right-side ordinate is for curve 602. It is further noted that both systems have a 3000 $\mu$m spacing between the first and second lenses.

The first and second spherical lenses of the system represented in curve 601 have illustrative respective radii of 400 $\mu$m and 1,200 $\mu$m, and each have an index of refraction of 1.5. In the system represented by curve 602 the spherical lens illustratively has a radius of 400 µm and an index of refraction of 1.5, while the planoconvex lens illustratively has a first surface radius of 1,500 µm, a thickness in the z-direction of 1,000 µm and an index of refraction of 1.552528. In this illustrative optical system, the nominal spacing between the exit face of the planoconvex lens and the waveguide is 2,000 µm.

Figure 6:
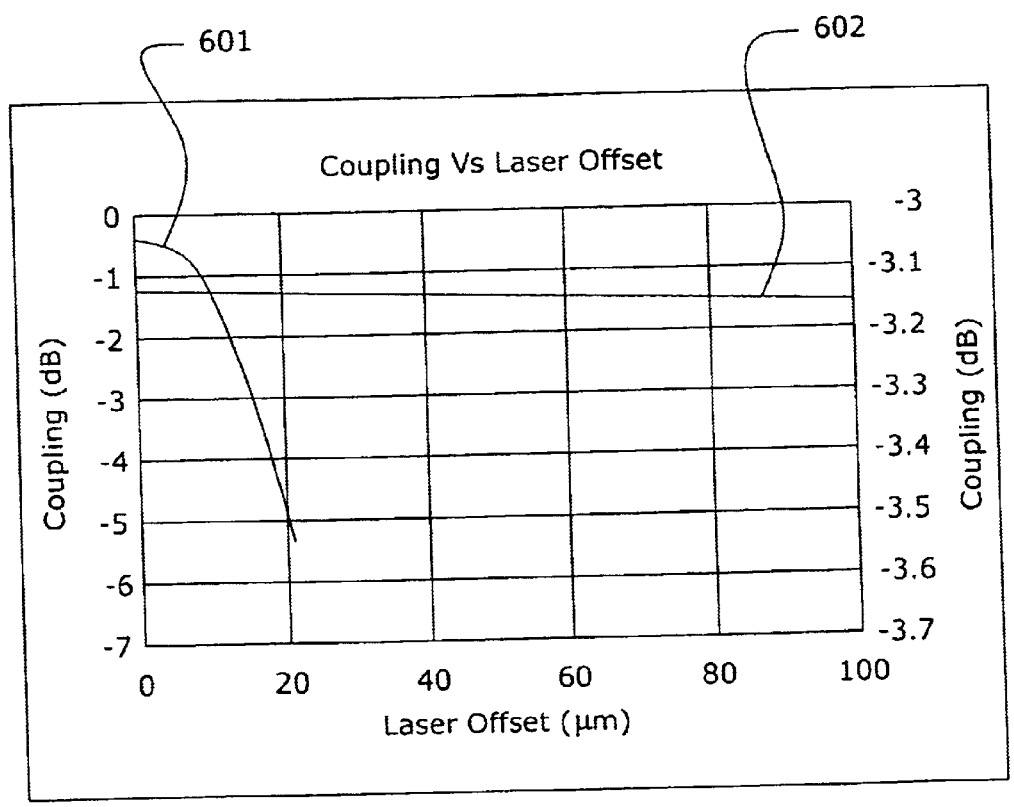
FIG. 6($a$) is a graphical representation showing optical coupling as a function of laser offset from the nominal position in accordance with an exemplary embodiment of the present invention.
Figure 6:
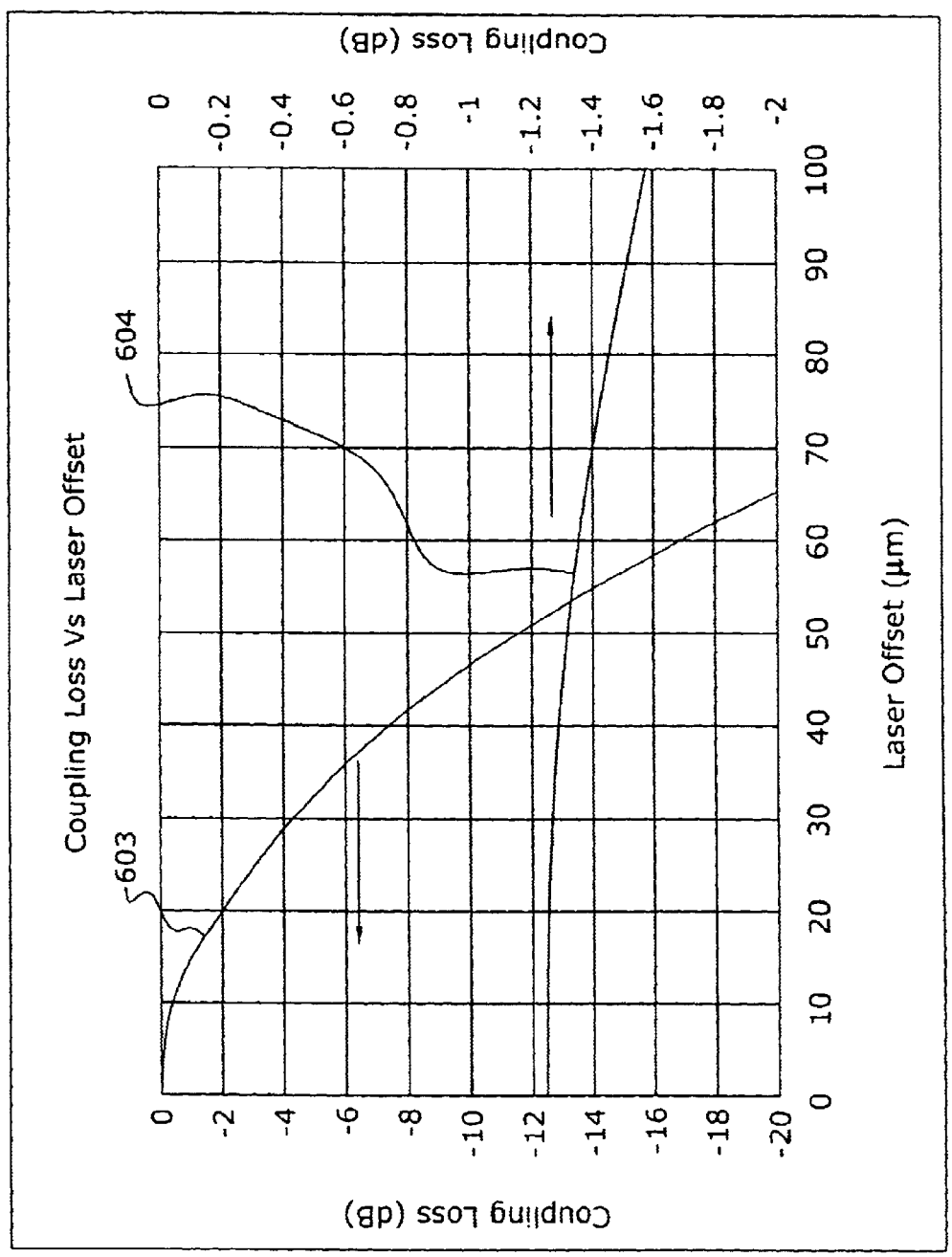
Figure 6:
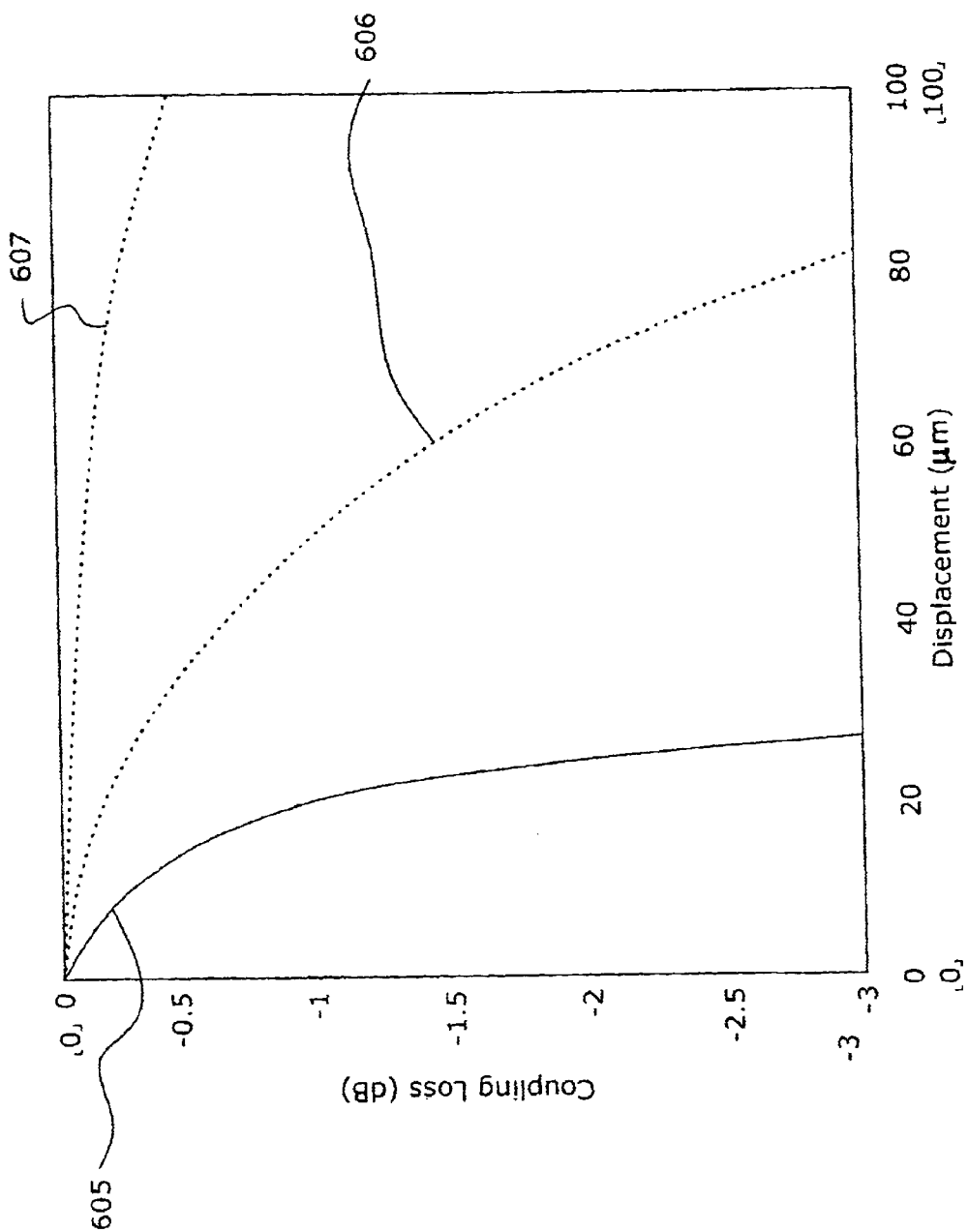

It is noted that in the exemplary optical systems represented in FIG. 6(*a*) the emitter (e.g., a laser) is illustratively positioned 100 µm from the edge of the first lens (the spherical lens). This results in a collimated beam, as is desired. For purposes of analysis, in this exemplary embodiment the laser far field is assumed to have an angle (FWHM) of 16.88° in the plane of the junction and an angle of 33.76° in the plane perpendicular to the junction. It is noted that this asymmetry in the beam does not severely affect the coupling with respect to a symmetric beam. Moreover, the focus from the collimated beam occurs at approximately 300 µm from the second spherical lens. This system achieves a maximum coupling of approximately 95%, as is predicted by mode coupling theory.

As can be readily appreciated from a review of the curve 602, the effect of the offset of the emitter for a particular $C_{system}$ value has substantially no impact on the coupling efficiency of the emitter to the waveguide, exemplifying a significant benefit of the present invention.

FIG. 6(*b*) is a graphical representation of the coupling loss for the two optical systems of FIGS. 3 and 4(*b*). The optical systems represented in FIG. 6(*b*) are similar to the spherical/planoconvex lens system described in conjunction with curve 602 of FIG. 6(*a*) excepting the spherical lens is replaced by an aspherical lens. As such the spacings and other parameters are substantially the same as previously described in connection with the spherical/planoconvex system.

Curve 603 represents the coupling loss for the spherical/aspherical lens described in conjunction with FIG. 6(*a*), and is used for purposes of comparison. It is noted that the left-side ordinate of the graph of FIG. 6(*b*) is for curve 603.

Curve 604 represents the coupling loss for the aspherical/planoconvex lens system discussed above. The ordinate for curve 604 is the right-most ordinate of FIG. 6(*b*).

As can be readily appreciated from a review of curve 604, for a given $C_{system}$ value, the effect of the offset of the emitter has substantially no impact on the coupling efficiency of the emitter to the waveguide.

Turning to FIG. 6(*c*) a graph of the coupling loss versus offset of the active device is shown for three representatives values of the matrix element C for an optical system in accordance with an exemplary embodiments of the present invention. Curve 605 is the coupling loss for $C_{system}=3\times10^{-3}/\mu m$; curve 606 is for $C_{system}=1\times10^{-3}/\mu m$; and curve 607 is for $C_{system}=3\times10^{-4}/\mu m$. As can be readily appreciated, the offset has virtually no impact on the coupling loss for over curve 607, while the coupling loss is adversely impacted by offset of the device to varying degrees over curves 606 and 605. Finally, it is noted that the above referenced values for $C_{system}$ are illustrative of typical values that may be obtained using the lens elements in arrangements described above. Of course, the presently described embodiment is merely illustrative, and other optical elements within the purview of one of ordinary skill in the art having had the benefit of the present disclosure could be used to realize such coupling in keeping with the present invention.

From the exemplary embodiments of the present invention an optical system is realized in which the offset of the first optical element (e.g., an emitter such as a laser) has little or no effect on the coupling efficiency between the first optical element (laser) and the optical waveguide (fiber). It is noted, once again, that the above exemplary embodiments are for purposes of illustration of the invention, and it is clear that other optical elements could be used to achieve the confocal, or nearly confocal, optical system resulting in efficient coupling between the active device and the fiber in spite of offset of the active device. In general, the coupling elements disposed between the active device and the optical waveguide must have sufficient spacing so that other devices, such as an optical isolator may be disposed between the laser and the optical waveguide. Moreover, the spacing must be great enough to satisfy other constraints while maintaining a large laser tolerance. In addition, the optical elements used to couple the active device to the optical waveguide usefully provide a desired magnification between the active device and the waveguide.

Finally, it is noted that while active device offset was described in detail relative to height offset (e.g., offset in the ±y-direction in the exemplary embodiments of FIGS. 1, 4(*a*) and 4(*b*)), it is clear that lateral displacement (i.e. ±x-direction offset in FIG. 1, FIG. 4(*a*) and FIG. 4(*b*)) are similarly analyzed in keeping with the teaching of the present invention. As such, the confocal or nearly confocal optical design of the present invention may also be applied to such lateral offset.

The invention having been described in detail, it will be readily apparent to one having ordinary skill in the art that the invention may be varied in a variety of ways. Such variations are not to be regarded as a departure from the scope of the invention. All such modifications as would be obvious to one of ordinary skill in the art, having had the benefit of the present disclosure, are intended to be included within the scope of the appended claims and the legal equivalents thereof.

I claim:

1. An optical apparatus comprising: a first optical element disposed proximate an optic axis; a second optical element disposed on said optic axis; and a third optical element disposed on said optic axis, and between said first and second optical elements; wherein said third optical element couples light that is incident at an angle relative to the optic axis which is substantially independent an offset of the first optical element in a direction perpendicular to the optic axis.

2. An optical device as recited in claim 1, wherein said third optical element is a confocal lens system.

3. An optical device as recited in claim 2, wherein said confocal lens system further comprises a first lens element and a ball lens element.

4. An optical device as recited in claim 3, wherein said first lens element and said second lens element are chosen from the group consisting essentially of:

an aspheric lens; ball lenses; a planoconvex lens; holographic optical elements; and digital optical elements.

5. An optical apparatus as recited in claim 1, wherein the apparatus substantially satisfies the relation:

$$\Psi = C_{system} y_{in}$$

where $\Psi$ is said incident angle, $y_{in}$ is said offset the optical apparatus, and $C_{system}$ is a parameter of which has a value less than approximately $0.002/\mu m$.

6. An optical apparatus as recited in claim 1, wherein said offset is approximately 25 µm and a coupling loss of the optical apparatus is less than approximately 1 dB.

7. An optical apparatus as recited in claim 1, wherein said second optical device approximates a confocal lens system.

8. An optical apparatus as recited in claim 1, wherein said offset is in the range of approximately 0 μm to approximately 50 μm.

9. An optical apparatus as recited in claim 1, wherein 1 apparatus substantially satisfies the relation:

$$\Psi = C_{system} y_{in}$$

where $\Psi$ is said incident angle, $y_{in}$ is said offset, and $C_{system}$ is a parameter of the apparatus.

10. An optical apparatus as recited in claim 9, wherein a coupling loss of the apparatus is approximately 1.0 dB to approximately less than approximately 0.25 dB.

11. An optical apparatus as recited in claim 10, wherein said $C_{system}$ is approximately 0.05/μm to approximately 0.001/μm.

12. An optical apparatus as recited in claim 10, wherein $\Psi$ is approximately 0.0 rad to approximately 0.048 rad.

13. An optical apparatus as recited in claim 5, wherein a maximum coupling loss in approximately 1 dB.

14. An optical apparatus as recited in claim 13, wherein $y_{in}$ is approximately 25 μm.

15. An optical apparatus as recited in claim 1, wherein said first optical device is an active device, and said third optical device is an optical waveguide.

16. An optical apparatus as recited in claim 15, wherein said active device is a laser.

17. An optical apparatus as recited in claim 15, wherein said optical waveguide is an optical fiber.

18. An optical apparatus as recited in claim 16, wherein said laser is bonded to a substrate, and an active layer of said laser is not directly in contact with said substrate.

19. An optical apparatus as recited in claim 9, wherein said $C_{system}$ is in the range of approximately 0.001/μm and approximately 0.002/μm and a coupling loss of the optical apparatus is in the range of approximately less than 0.25 dB to approximately 1.0 dB.

20. An optical apparatus as recited in claim 1, wherein said second optical element is a confocal lens system which further comprises an aspherical lens and a planoconvex lens.

21. An optical apparatus as recited in claim 7, wherein said first lens element and said second lens element are chosen from the group consisting essentially of:

an aspheric lens; ball lenses; a planoconvex lens; holographic optical elements; and digital optical elements.

22. An optical apparatus as recited in claim 7, wherein said confocal lens system further comprises an aspherical lens and a planoconvex lens.

23. An optical system as recited in claim 1, wherein said third optical element effects a level of magnification.

\* \* \* \* \*